United States Patent [19]
Ohta

[11] Patent Number: 5,596,640
[45] Date of Patent: Jan. 21, 1997

[54] DIGITAL IMAGE FORMING APPARATUS WITH DATA CONVERSION

[75] Inventor: Junichi Ohta, Yokohama, Japan

[73] Assignee: Ricoh Company, Ltd., Tokyo, Japan

[21] Appl. No.: 261,267

[22] Filed: Jun. 15, 1994

[30] Foreign Application Priority Data

Jun. 18, 1993 [JP] Japan ................................. 5-147820

[51] Int. Cl.⁶ .............................. H04N 1/44; H04N 1/417
[52] U.S. Cl. ............................ 380/18; 380/51; 380/54; 380/55; 382/235; 382/306; 358/430
[58] Field of Search .............................. 380/18, 51, 54, 380/55; 382/235, 306; 358/430

[56] References Cited

U.S. PATENT DOCUMENTS

| | | | |
|---|---|---|---|
| 5,245,655 | 9/1993 | Bühn et al. | 380/18 |
| 5,258,998 | 11/1993 | Koide | 380/18 X |
| 5,293,469 | 3/1994 | Outa et al. | |
| 5,321,749 | 6/1994 | Virga | 380/18 |
| 5,337,362 | 8/1994 | Gormish et al. | 380/54 |

*Primary Examiner*—Gilberto Barron, Jr.
*Attorney, Agent, or Firm*—Oblon, Spivak, McClelland, Maier & Neustadt, P.C.

[57] ABSTRACT

An image forming apparatus including an operating board for indicating operating modes, a document reading member and an outputting member for outputting data. An image compressing member compresses image data read by the document reading member and a memory member records the compressed image data, wherein the outputting member produces an output image on a paper sheet based on the compressed image data recorded in the memory member. An image extracting member extracts the compressed data from image data which are obtained by reading the output image by the image reading member and a decompressing member decompresses the compressed image data which are extracted by the image extracting member, wherein the outputting member produces an output image on a paper sheet based on the decompressed image data. With input image data being preserved, the image data are compressed by an image compressing part are thus converted into a cryptograph. The compressed image data are formed by a first image forming part and are output on documents in a form which can not be recognized. In the case of restoration, the output documents which can not be recognized are scanned and the compressed image data are picked up by a compressed image extracting part. The picked up image data are restored into the original image by an image decompressing part, that is, the recognizable image is restored to a usual format on paper sheets by a second image forming part.

4 Claims, 14 Drawing Sheets

| PASSWORD | PAGE NUMBER | AREA POSITION INFORMATION | LENGTH OF DATA | DATA OF THE FIRST PAGE |

| PASSWORD | PAGE NUMBER | AREA POSITION INFORMATION | LENGTH OF DATA | DATA OF THE SECOND PAGE |

| PASSWORD | PAGE NUMBER | AREA POSITION INFORMATION | LENGTH OF DATA | DATA OF THE THIRD PAGE |

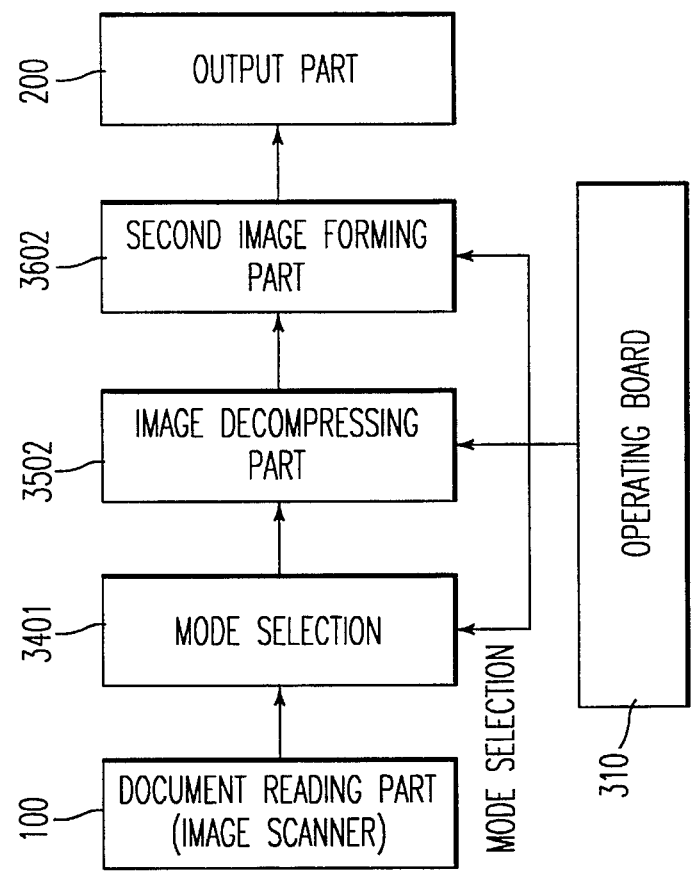
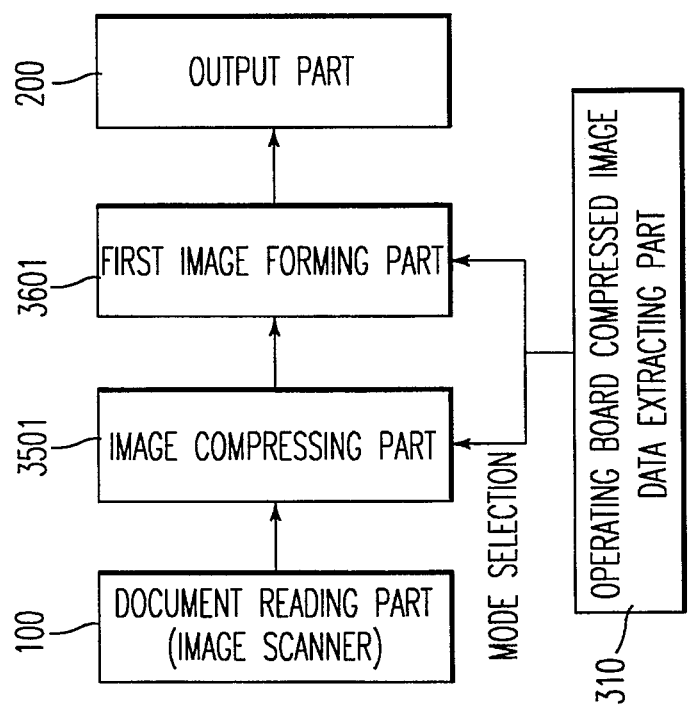

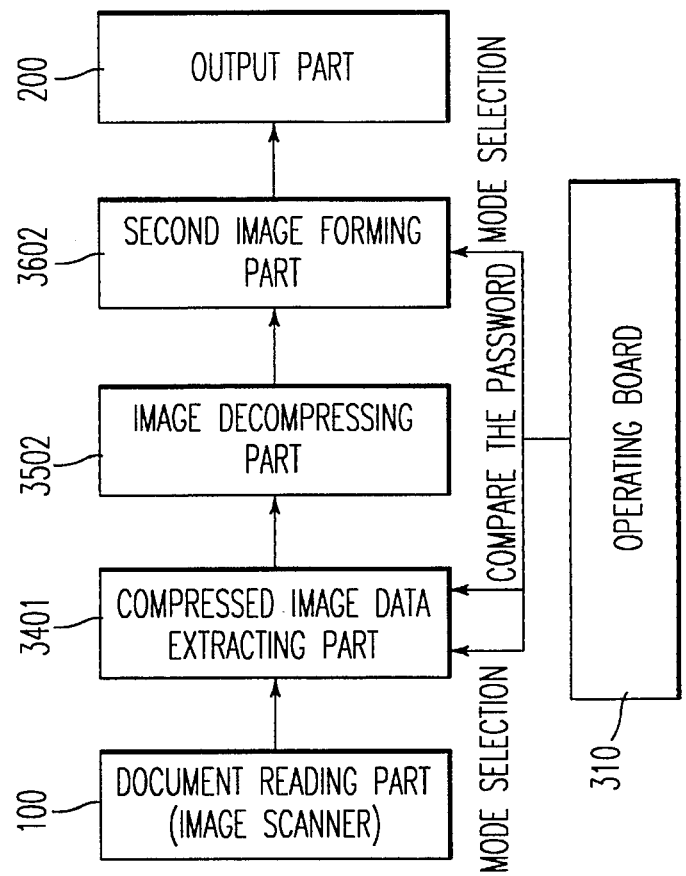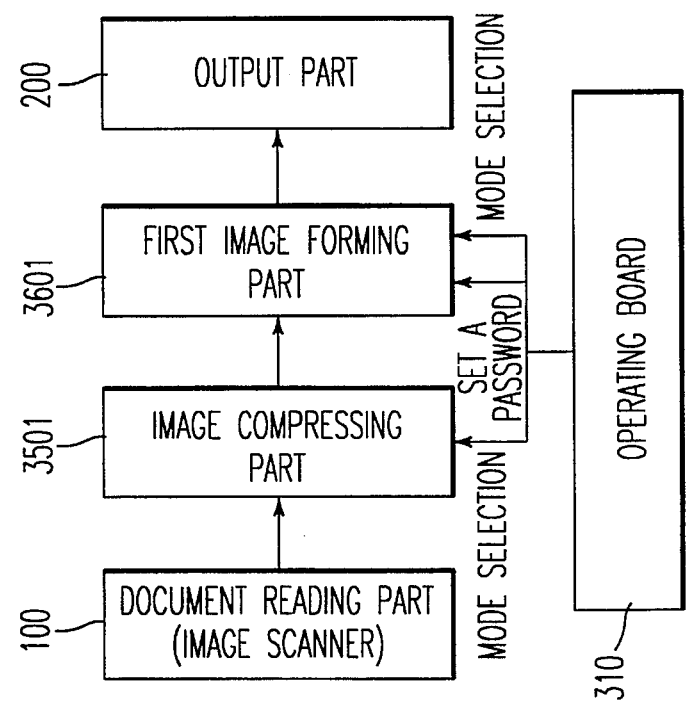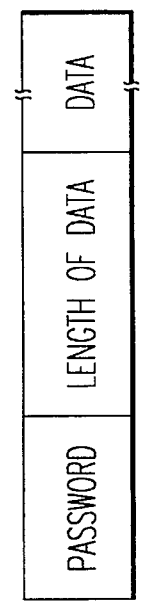

*FIG. 16A*
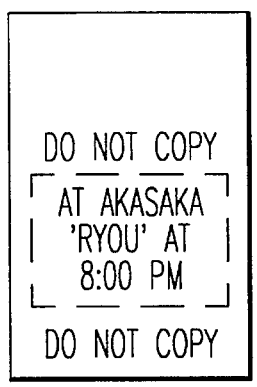
*FIG. 16B*
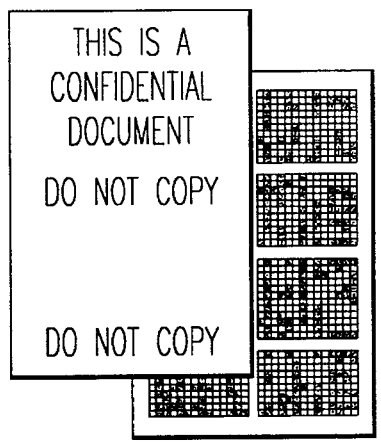
*FIG. 17*
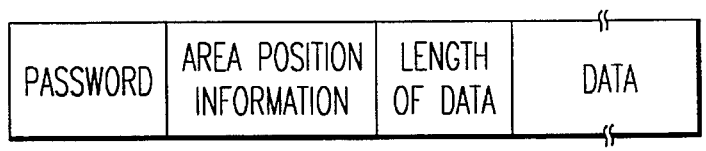
*FIG. 18*
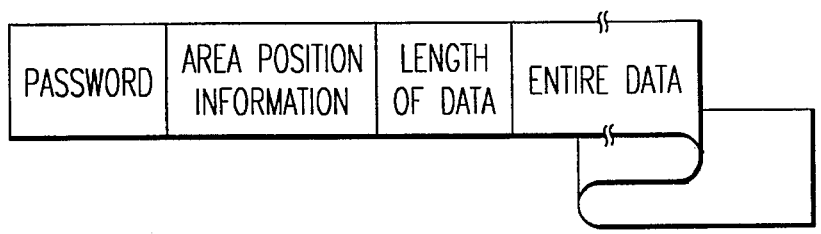
*FIG. 19*
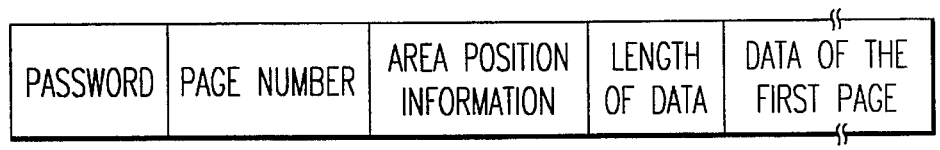
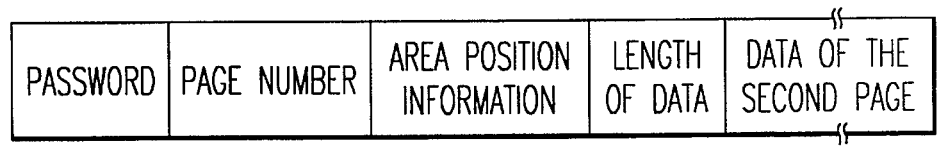
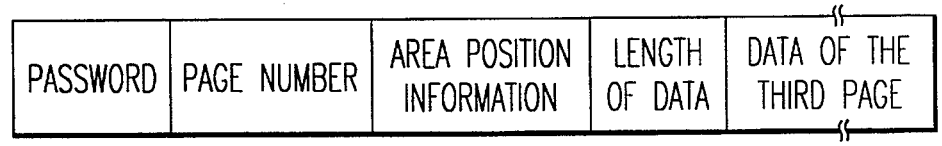

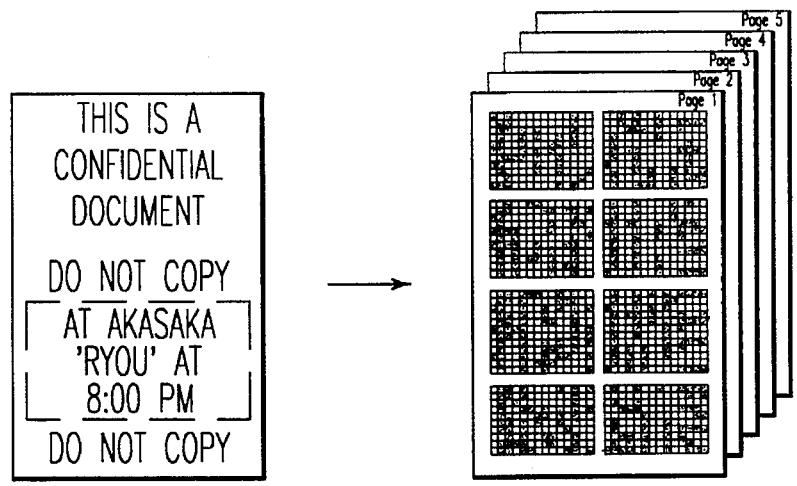
*FIG.21A*  *FIG.21B*
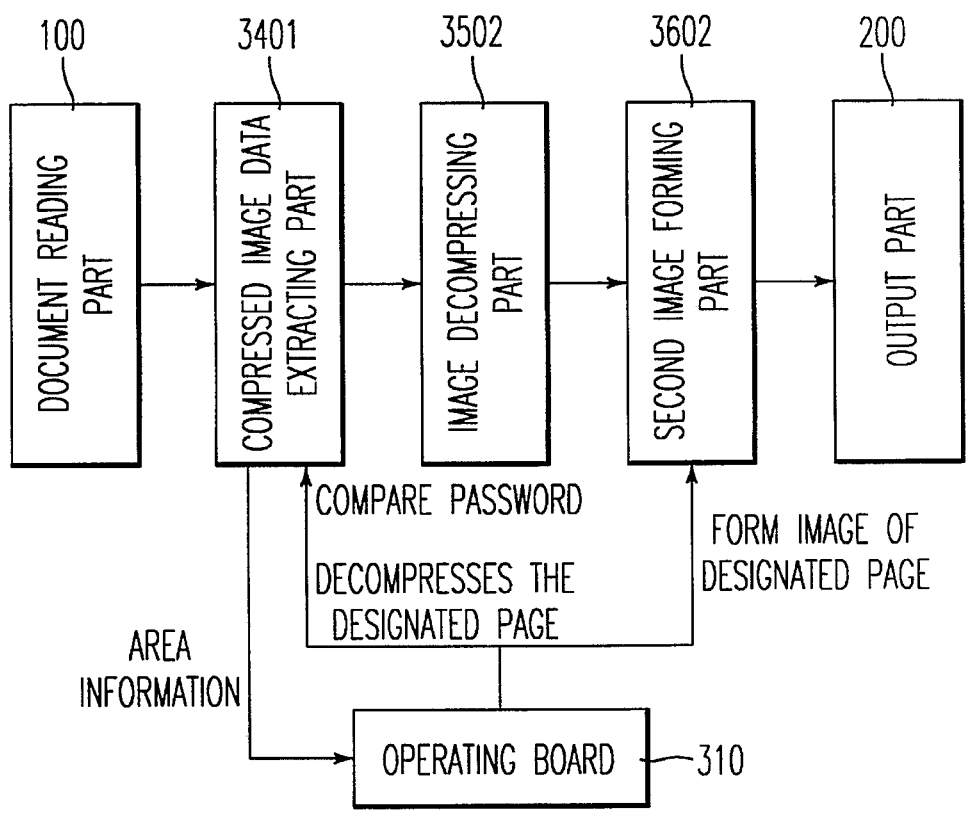
*FIG.22*

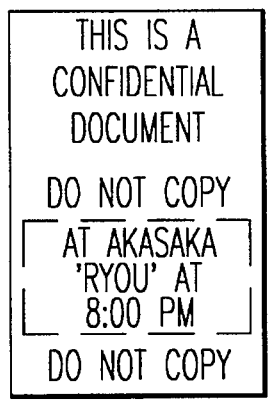  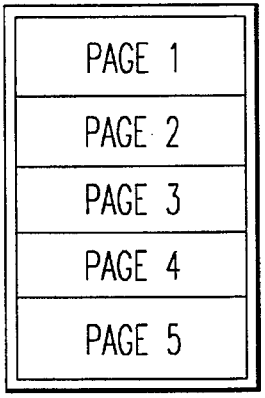  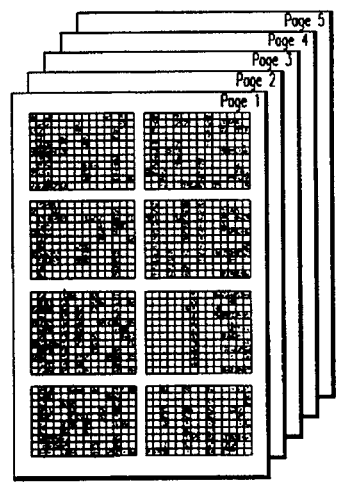
FIG.24A  FIG.24B  FIG.24C
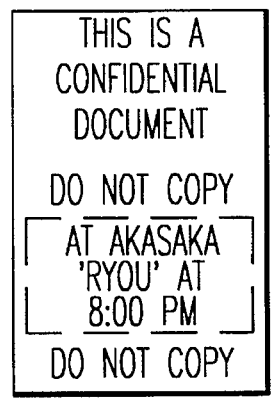  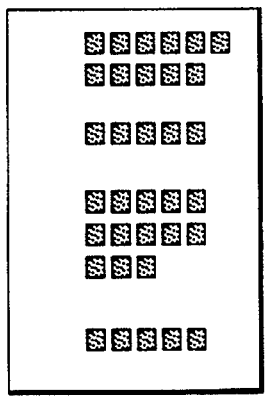  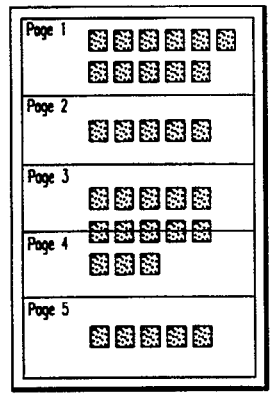
FIG.25A  FIG.25B  FIG.25C
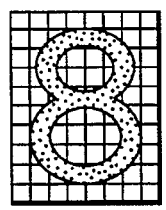  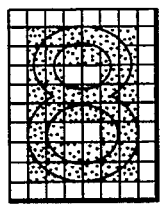
FIG.26A  FIG.26B

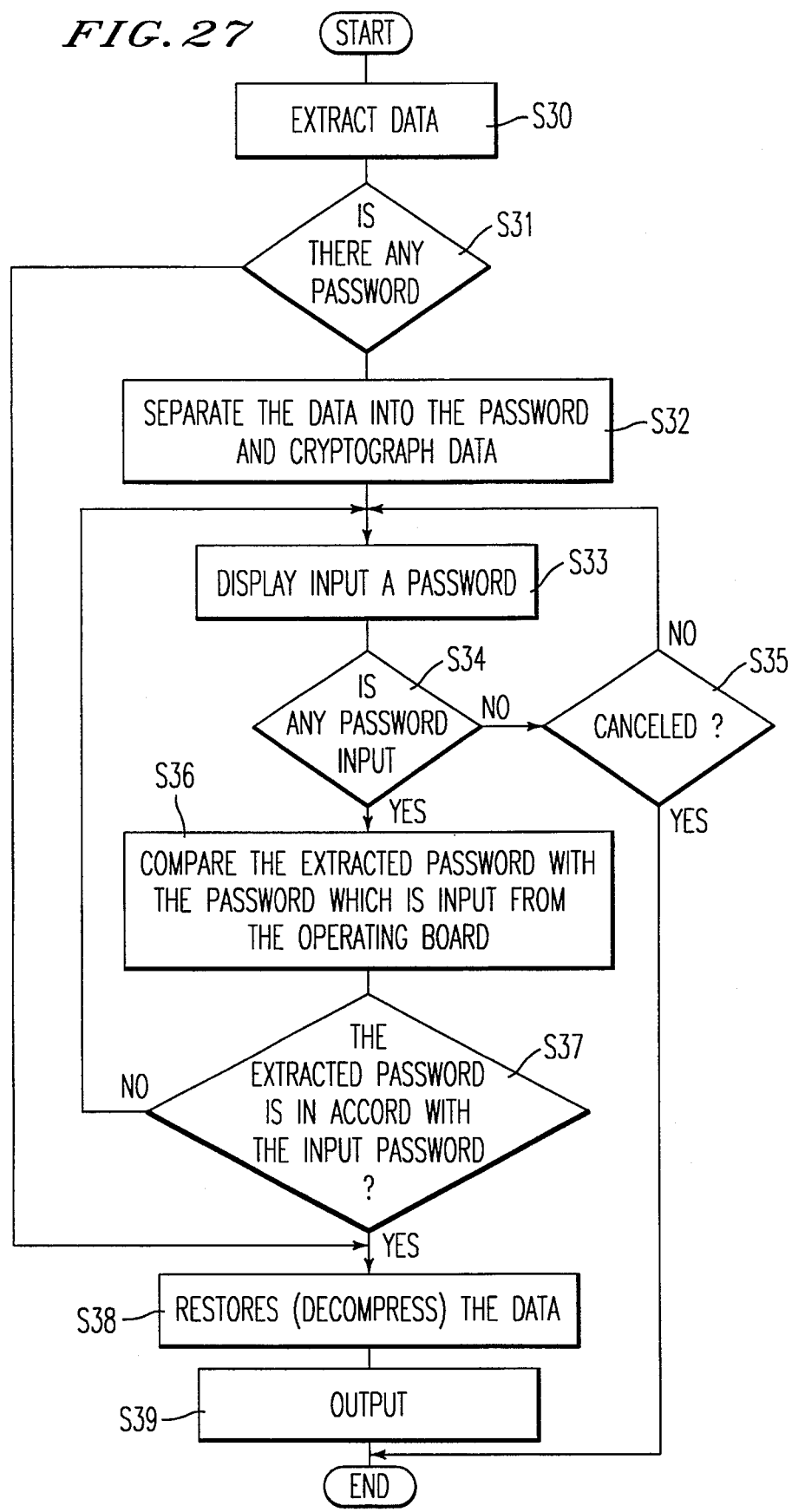

DIGITAL IMAGE FORMING APPARATUS WITH DATA CONVERSION

BACKGROUND OF THE INVENTION

1. Field of the Invention

The present invention relates to a digital image forming apparatus capable of converting input image data into a format which can not be recognized (hereinafter referred as a cryptograph) and preserving the converted cryptograph image data, and capable of restoring the cryptograph image data.

2. Description of the Related Art

Conventionally, confidential documents are handled by putting stamps on the confidential documents marking them as, e.g., "CONFIDENTIAL".

In the conventional method, it is difficult to keep confidential documents secret, as long as the documents are in a usual form which can be recognized by persons even if such stamps which mean a secret are displayed on the documents.

SUMMARY OF THE INVENTION

Accordingly, one object of the present invention is to provide a novel digital image forming apparatus which overcomes the above and other problems encountered in the aforementioned art.

It is a further object of the present invention to provide a novel digital image forming apparatus capable of cheaply keeping documents to be secret, it being difficult to keep documents to be secret in the conventional apparatus.

The above mentioned objects of the present invention are achieved by an image forming apparatus having an operating board for indicating operating modes, a document reading member and an outputting member for outputting data. The present invention also includes an image compressing member for compressing image data which are read by the document reading member, a memory member for recording the compressed image data, wherein the outputting member produces an output image on a paper sheet based on the compressed image data recorded in the memory member, an image extracting member for extracting the compressed data from image data which are obtained by reading the output image by the image reading member and, a decompressing member for decompressing the compressed image data which are extracted by the image extracting member, wherein the outputting member produces an output image on a paper sheet based on the decompressed image data.

With input image data being preserved, the image data are compressed (such as in a Modified Huffuman process, a Modified Read process or a conventional compressing process in a field of the computer) by an image compressing part. That is, the image data are converted into code data. The compressed image data are developed as image data by a first image forming part and are output on documents in a form which can not be recognized (cryptograph).

In the case of restoration, the output documents which can not be recognized are scanned and the compressed image data are picked up by a compressed image extracting part. The picked up image data are restored into the original image by an image decompressing part, that is, the recognizable image is formed in the usual format on paper sheets by a second image forming part.

According to a further feature of the present invention, the above mentioned objects of the present invention are achieved by an image forming apparatus. The image forming apparatus includes a document reading means, an image compressing means for compressing image data which are read by the document reading member, a memory, wherein the compressed image data are coded and recorded in the memory, and an output means for outputting the coded compressed image data without decompressing.

BRIEF DESCRIPTION OF THE DRAWINGS

A more complete appreciation of the present invention and many of the attendant advantages thereof will be readily obtained as the same becomes better understood by reference to the following detailed description when read in conjunction with the accompanying drawings, wherein:

FIG. 3 is a block diagram showing a cryptograph processing unit according to a first embodiment of the present invention;

FIG. 4 is a block diagram showing a cryptograph restoring unit according to the first embodiment of the present invention;

FIG. 11 is a block diagram showing a cryptograph processing unit according to a second embodiment of the present invention;

FIG. 12 is a block diagram showing a cryptograph restoring unit according to the second embodiment of the present invention;

FIG. 13 is a diagram illustrating an example of a data structure according to the second embodiment of the present invention;

FIGS. 16(a) and 16(b) are diagrams illustrating an original document and an example of the output paper according to the third embodiment of the present invention;

FIG. 17 is a diagram illustrating an example of a data structure according to the third embodiment of the present invention;

FIG. 18 is a diagram illustrating an example of a data structure according to a fourth embodiment of the present invention;

FIG. 19 is a diagram illustrating an example of a data structure according to a fourth embodiment of the present invention;

FIGS. 21(a) and 21(b) are diagrams illustrating an original document and an example of the output paper according to the fourth embodiment of the present invention;

FIG. 22 is a block diagram showing a cryptograph restoring unit according to a fifth embodiment of the present invention;

FIGS. 24(a), 24(b) and 24(c) are diagrams illustrating an original document and an example of the output paper according to the sixth embodiment;

FIGS. 25(a, 25(b) and 25(c) are diagrams illustrating an original document and an example of the out-put paper according to a seventh embodiment of the present invention; and FIGS. 26(a) and 26(b) are diagrams illustrating a cryptograph image on a paper sheet; and FIG. 27 is a flow chart of processing according to the second embodiment of the present invention.

DESCRIPTION OF THE PREFERRED EMBODIMENT

Figure 1:
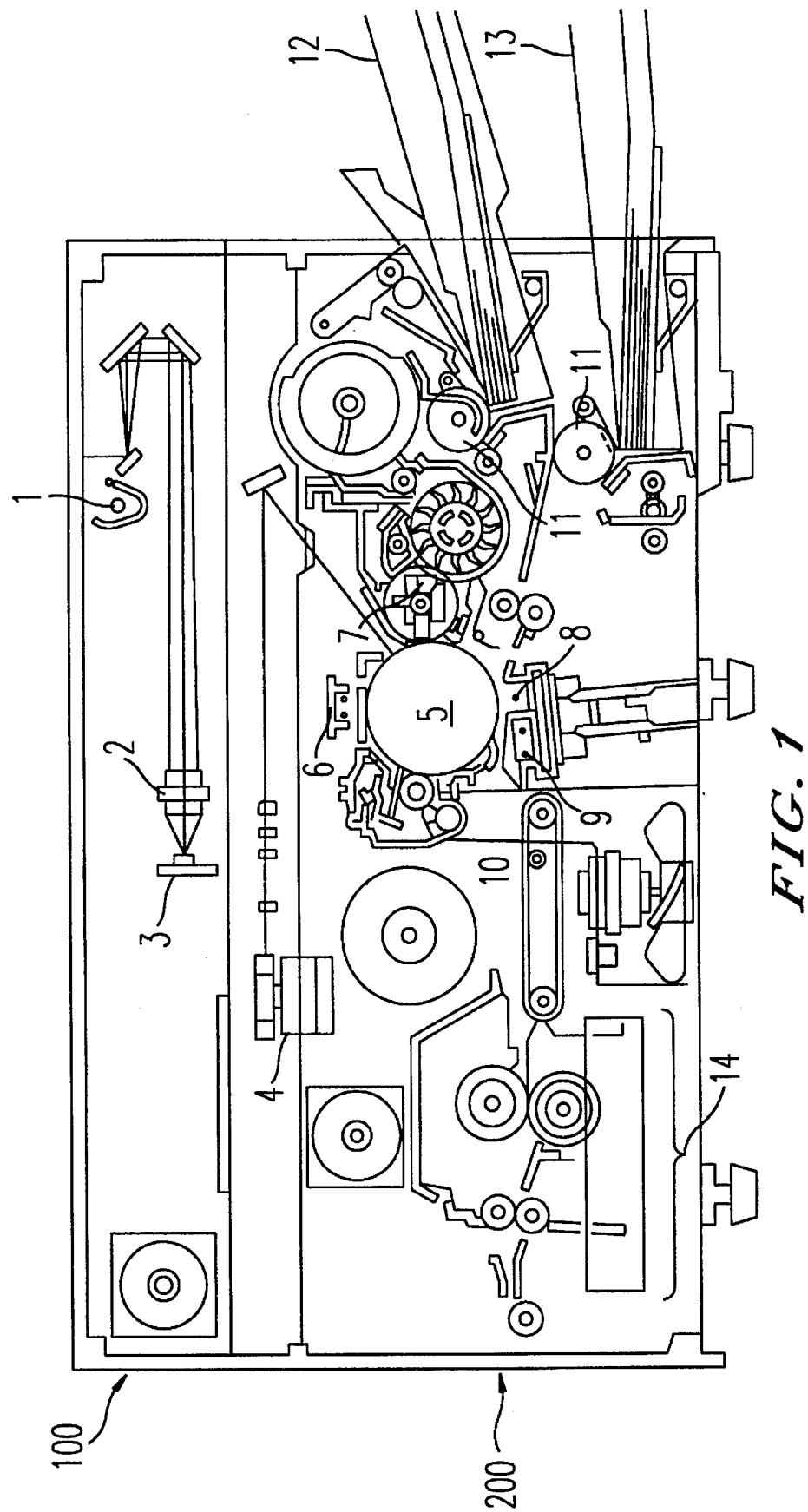
FIG. 1 is a side view showing a digital image forming apparatus having a cryptograph function according to the present invention.

A description will now be given of preferred embodiments of the present invention referring to the drawings wherein like reference numerals designate identical or corresponding parts throughout the several views.

FIG. 1 is an entire structure of a side view showing a digital image forming apparatus. The digital image forming apparatus mainly comprises an image scanner 100 which is provided in an upper portion of the apparatus and a laser printer 200 which is provided in a lower portion of the apparatus.

A contact glass on which documents are placed is provided over the image scanner 100. An optical scanning system which is made up of an exposing lamp 1, various mirrors, lenses 2 and a light receiving portion 3 is provided under the image scanner 100.

A document is exposed by the exposing lamp 1 of the image scanning system, and the reflected light from the document, that is, the image light, is focused on the light receiving portion 3 via the various mirrors and the lenses 2 of the image scanning system. The light receiving portion 3 has a one dimensional charge coupled device (hereinafter referred as a one dimensional CCD) image sensor. Since the optical scanning system is driven mechanically toward the left and right direction looking at FIG. 1 by a driving system, the image light which is generated by exposing a document is read in order line by line by the image sensor.

The image information which is scanned by the image sensor is converted into an output image by an operation which is described later. A writing apparatus 4 of the laser printer 200 outputs modulated laser light. The modulated laser light based on the image information is focused on a surface of a photoconductive drum 5 via an optical system for writing. The entire surface of the photoconductive drum 5 previously is charged uniformly to a predetermined high electrical potential by a main charger 6. The electrical potential is changed based on intensity of the light, and distribution of the electric potential which is formed corresponding to the original image, that is, a latent image, is formed when the surface of photoconductive drum 5 receives the image light.

Toner is attached to the latent image which is formed on the photoconductive drum 5 when the photoconductive drum 5 passes through a developing unit 7 and, therefore, a toner image (a visible image) is formed.

A paper sheet is fed from a selected paper cassette 12 or 13 by a paper feeding roller 11, and the feeding of the paper sheet is timed to match a position of the visible toner image on the photoconductive drum 5. The toner image on the photoconductive drum 5 is transferred onto the paper sheet by a transferring charger 8. The paper sheet having the toner image formed thereon is separated from the photoconductive drum 5 by driving a separating charger 9 and is transported to a fixing unit 14. After the toner image is fixed on the paper sheet by the fixing unit 14, the paper sheet is discharged out of the image forming apparatus.

The surface of the photoconductive drum 5 is cleaned by a cleaning unit 10 to prepare for the next image forming operation after the transferring of the toner image and the separation of the paper sheet.

An electrical transmission of the digital image forming apparatus will now be explained referring to FIG. 2.

Figure 2:
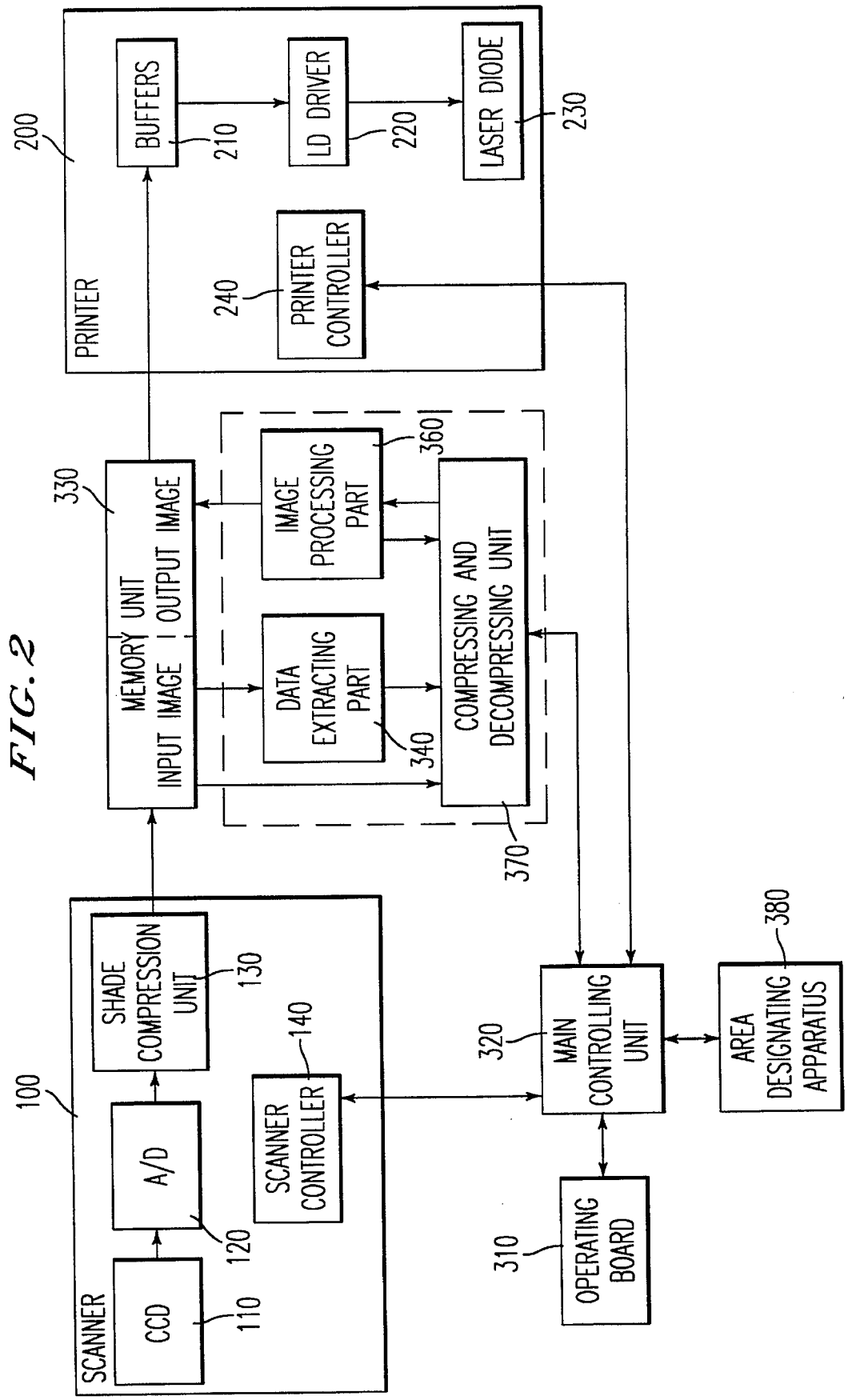
FIG. 2 is a block diagram showing functions of the digital image forming apparatus with the cryptograph function according to the embodiments of the present invention.

As shown in FIG. 2, the image scanner 100 includes a color CCD image sensor 110, an analog/digital converter 120 (hereinafter referred as an A/D converter), a shading compensating unit 130, and a scanner controller 140. The laser printer 200 comprises buffers 210, a laser diode driver 220 (hereinafter referred as an LD driver), a laser diode 230 and a printer controller 240. A cryptograph processing part 370 is made up of a data extracting part 340, a compressing and decompressing unit 350 and an image processing part 360. Further, an operating board 310, a main controlling unit 320, a memory unit 330 and an area designating apparatus 380 are shown in FIG. 2.

Next, a description will be given of an operation of the electrical transmission.

After document image signals in a form of a bit map format, which are read by the color CCD image sensor 110, are converted into digital signals by the A/D converter 120, then dispersion of density levels in the signals is compensated by the shading compensating unit 130. The compensated image signals are then recorded in the memory unit 330. The cryptograph processing part 370 processes the information of the input image from the memory unit 330 and forms an output image to the memory unit 330 as described below.

The information of the output image on the memory unit 330 is sent to the laser printer 200 in a form of binary information corresponding to white or black pixels. The binary information passes through the buffers 210 and the LD driver 220 and is sent to the laser diode 230 as driving signals. Therefore, the laser diode 230 outputs laser light which is modulated corresponding to the information of the output image. The laser light is output from the writing apparatus 4 and is exposed onto the surface of the photoconductive drum 5 via the optical scanning system.

Indications of an operator are input by using keys of the operating board 310 which is disposed on an upper face of the image forming apparatus. The main controlling unit 320 controls various displays on the operating board 310 and reads inputs from the keys of the operating board 310 and sends commands (such as a start command of reading or a start command of outputting an image) to the various parts. Further, areas to be processed are designated by the area designating apparatus 380 which includes a tablet and a pen.

A description will now be given of a first specific embodiment according to the present invention.

Figure 5A:
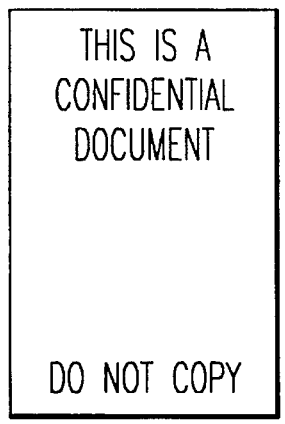
FIGS. 5(a) and 5(b) are diagrams illustrating an original document and an example of the output paper sheet according to the first embodiment of the present invention.
Figure 5B:
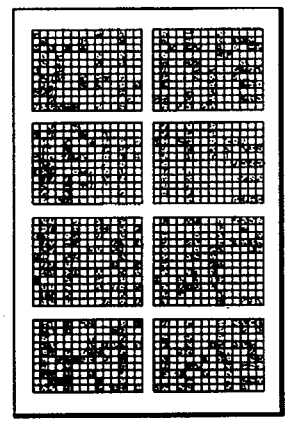

As shown in FIG. 3, when a cryptograph mode is designated by the operating board 310, an image of a confidential document as shown in FIG. 5(*a*) is read by the image scanner 100 and the image data are recorded in the memory unit 330. After that, the cryptograph processing part 370 compresses the image which is recorded in the memory unit 330 using an image compressing part 3501 of the compressing and decompressing unit 350.

A first image forming part 3601 of the image processing part 360 makes the compressed image into a matrix form as shown in FIG. 5(*b*) and records the image of the matrix form in the memory unit 330. In the case of restoration, the matrix images which are divided into a plurality of blocks make searching corners of an outline of the cryptograph image easy, which is described later.

Finally, the output image which is recorded in the memory unit 330 is formed on a paper sheet by the laser printer 200 and the paper sheet is discharged out of the image forming apparatus.

A block diagram of the cryptograph restoring unit is shown in FIG. 4. In the restoring operation, the cryptograph on the document is read by the image scanner 100 (the cryptograph has been made in the manner mentioned above). The compressed image data extracting part 3401 of the data extracting part 340 extracts the cryptograph data of the document in a method as described later. The extracted compressed image data are decompressed by the image decompressing part 3502 of the compressing and decompressing unit 350, and next the decompressed image data are recorded as an output image in the memory unit 330 by the second image forming part 3602 of the image processing part 360. Finally, the laser printer 200 forms the output image, which is recorded in the memory unit 330, on a paper sheet and discharges the paper sheet out of the apparatus.

According to the first embodiment, it is easy to make a cryptograph or restore the original image in a digital image forming apparatus of a simple structure.

Next, description will now be given of the image forming method of the first image forming part 3601.

Figure 7:
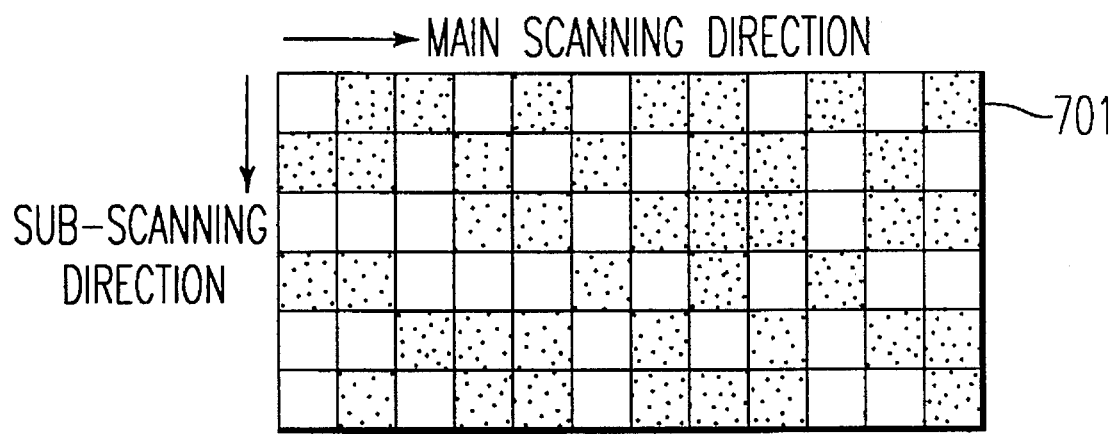
FIG. 7 is a diagram showing a cryptograph restoring operation according to the first embodiment of the present invention.

Bits of "1" or "0" of the compressed image data are formed in order as an image of black or white in a form of a matrix on a paper sheet as shown in FIG. 7. Accordingly, a bit "1" corresponds to black and a bit "0" corresponds to white. As a result, the output paper is obtained as shown in FIG. 5(*b*). It is impossible to recognize the input original image from the image shown in FIG. 5(*b*) and the image data can thus be kept confidential.

Figure 6:
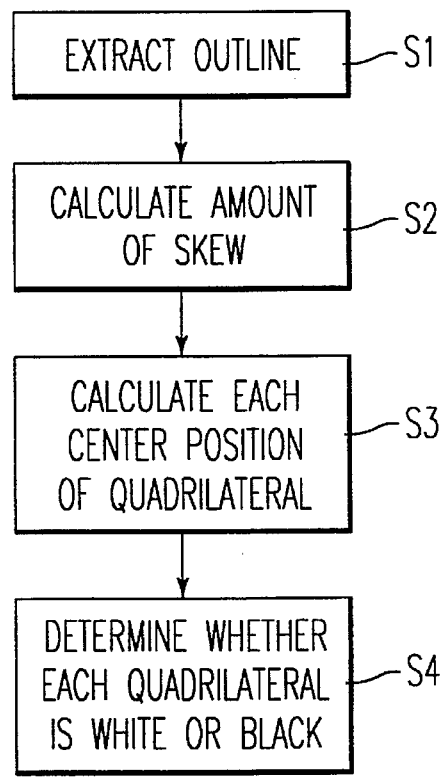
FIG. 6 is a flow chart of a cryptograph restoring operation according to the first embodiment of the present invention.

On the other hand, the cryptograph image is restored in a flow as shown in FIG. 6.

First, an outline of the image is extracted from the scanned image as shown in FIG. 7 in step S1. A part 701 on which the data are written is shown in FIG. 7.

Figure 8:
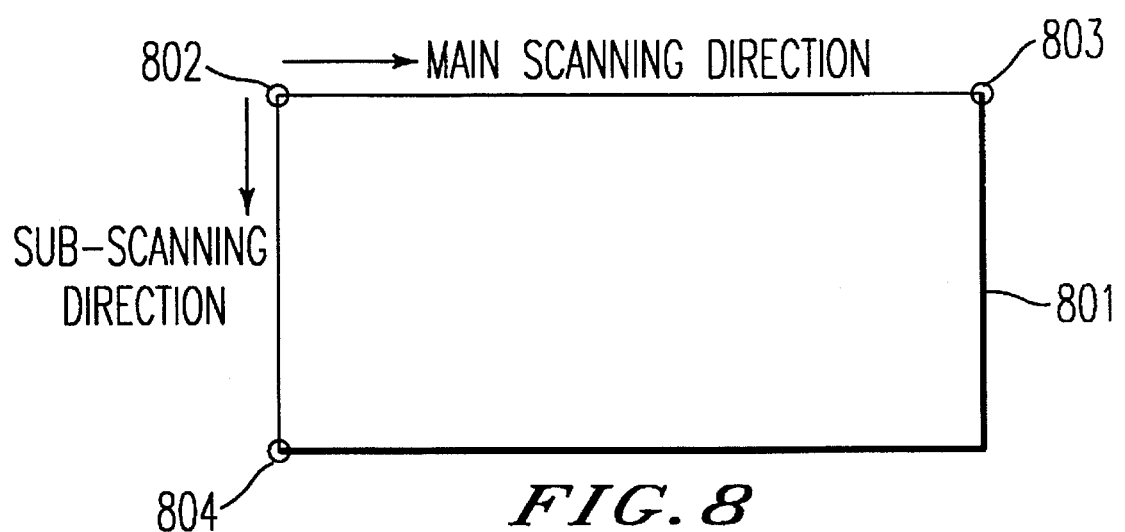
FIG. 8 is a diagram showing a cryptograph restoring operation according to the first embodiment of the present invention.

Coordinates of corners 801 to 804 of the outline 801 as shown in FIG. 8 are calculated. A starting point 802 of the outline to an ending point 803 are searched in a scanning direction and the starting point 802 to an ending point 804 are searched in a sub-scanning direction.

Figure 9:
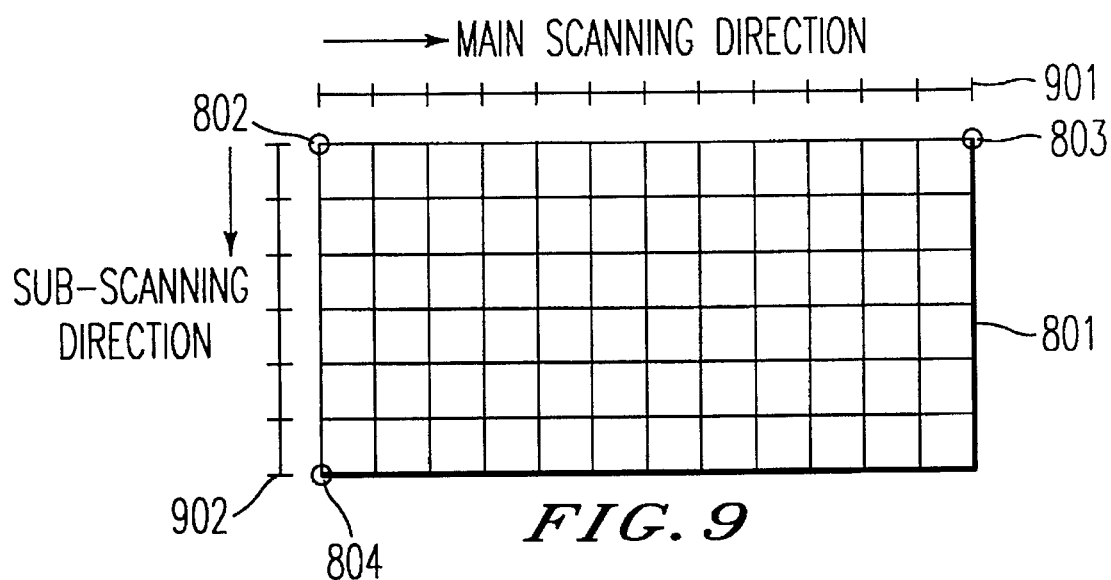
FIG. 9 is a diagram showing a cryptograph restoring operation according to the first embodiment of the present invention.

Next, As shown in FIG. 9, the outline between the corners 802 and 803 in the scanning direction is divided by a predetermined number (or distance) and the outline between the corners 802 and 804 also is divided by a predetermined number (or distance) and, thereby, the matrix form on which the data are written is assumed on the document.

An angle formed by the main scanning line and the line connecting the corners 802 and 803 showing an amount of skew are then determined in step S2, and each position of the quadrilaterals (squares or rectangles etc.) of the matrix is corrected based on the amount of the skew.

Figure 10:
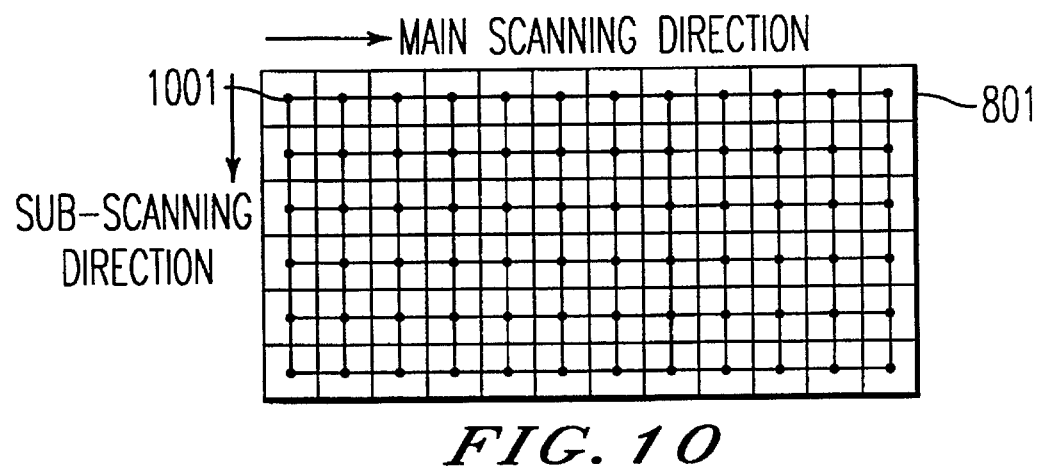
FIG. 10 is a diagram showing a cryptograph restoring operation according to the first embodiment of the present invention.
Figure 14:
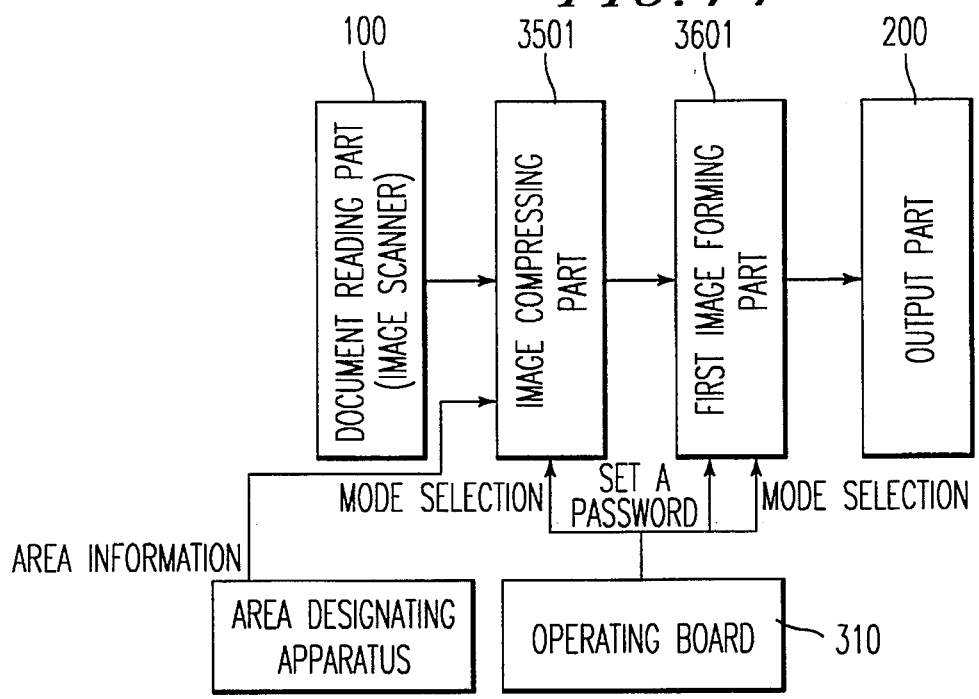
FIG. 14 is a block diagram showing a cryptograph processing unit according to a third embodiment of the present invention.
Figure 15:
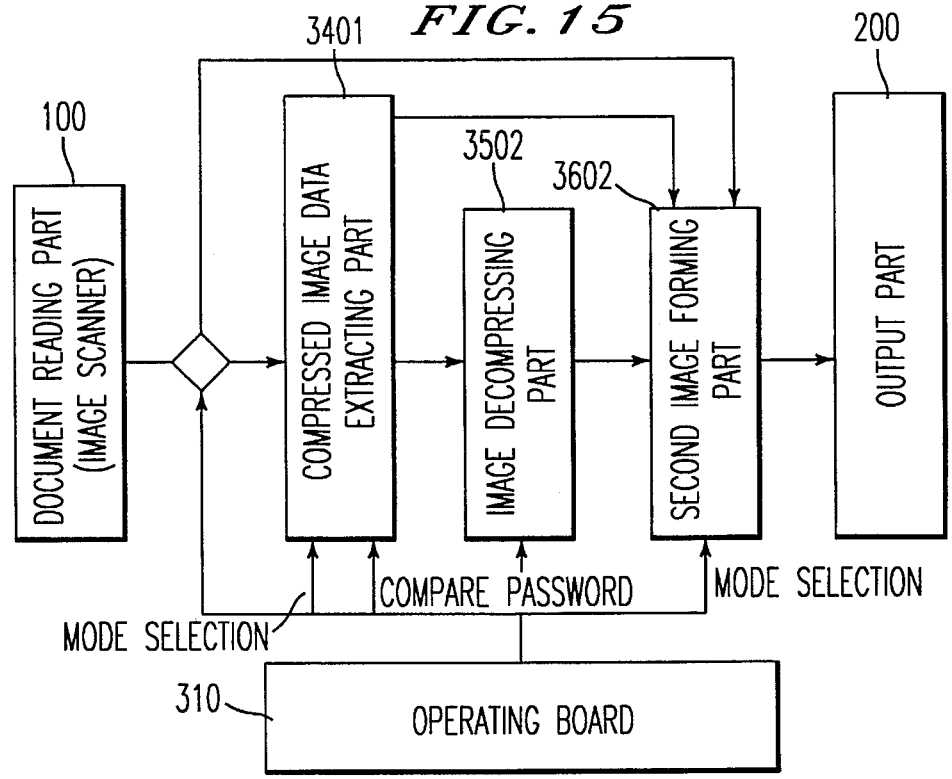
FIG. 15 is a block diagram showing a cryptograph restoring unit according to the third embodiment of the present invention.

Finally, as shown in FIG. 10, the center positions of the quadrilaterals of the matrix (1001 etc.) are calculated in step S3. Whether each pixel is white or black at each center position of the quadrilaterals is then determined in step S4. The white pixel is converted into a bit "0" and the black pixel is converted into a bit "1", and thereby, the cryptograph image is restored into the original data.

A second embodiment of the present invention will now be explained below.

As shown in FIG. 11, in the case of making a cryptograph, the image scanner 100 scans a document {e.g. as shown in FIG. 5(*a*)} as in the first embodiment. After the obtained image data are recorded in the memory unit 330, the image compressing part 3501 compresses the image data in the memory unit 330 and sends the compressed image data to the first image forming part 3601. A password which has been input from the operating board 310 and the compressed image data are synthesized and are recorded as an output image in the memory unit 330. The output image is output on a paper sheet by the laser printer 200, and the paper sheet is discharged out of the apparatus.

In the case of restoration, as shown in FIG. 12 and FIG. 27, the compressed image data extracting part 3401 extracts data from the cryptograph image on the document in step S30, which is read by the image scanner 100. Next, whether a password is contained in the data is determined in step S31. When the password is in the data, the extracted data are separated into the password and the compressed image data in step S32, and an indication "Input A Password" is displayed on the operating board 310 in step S33. When a password is input from the operating board 310 in step S34, the separated password is compared with the password which is input from the operating board 310 in step S36. When the extracted password is in accord with the input password in step S37, the data are decompressed by the image decompressing part 3502 in step S38, and the second image forming part 3602. The laser printer 200 then outputs an image on a paper sheet in step S39. An example of the data format is shown in FIG. 13.

When any password is not input in step S34, it is determined whether or not the operation is canceled in step S35. When the operation is canceled, the operation is ended. When the operation is not canceled, the indication "Input A Password" is displayed in step S33.

In case there is no password in the extracted data in step S31, the extracted data are decompressed and output in steps S38, S39. When the extracted password is not in accord with the input password in step S37, the operation returns to step S33 and the indication "Input A Password" is displayed in step S33. According to the second embodiment, since it is possible to verify the passwords, a secret is strictly and easily kept.

A description will now be given of a third embodiment according to the present invention.

In the cases of the first and second embodiments, when the cryptograph operation is carried out to an entire document and the amount of information of an output image is more than that of an input image, there can be a case in which all the data can not be put in a paper sheet up to the amount of information of a document.

In the third embodiment, the image forming apparatus has an area designating apparatus 380 (an area designating member) like a digitizer.

An area shown by a dotted line in FIG. 16(*a*) is designated and an image on the document is scanned by the image scanner 100. After the image data are recorded in the memory 330, the image compressing part 3501 compresses only the image within the designated area, and the first image forming part 3601 and the laser printer 200 produce a cryptograph output on a paper sheet as shown in FIG. 16(*c*). An image outside of the designated area on the document is output as it is (which is not a cryptograph.)

In the case of the restoration, the cryptograph output on the paper sheet is scanned by the image scanner 100 and the compressed image data extracting part 3401 extracts the compressed image data and then the image data and the position information of the compressed data are extracted. Next, the image decompressing part 3502 decompresses the compressed image, and the second image forming part 3602 records the decompressed image in the memory unit 330. The area outside of the designated area is scanned and the image data are recorded in the memory unit 330. The second image forming part 3602 synthesizes the two images which are recorded in the memory unit 330, and the laser printer 200 produces the synthesized two images on an output paper sheet.

An example of a structure of the cryptograph data is shown in FIG. 17.

According to the third embodiment, in the case of having a large amount of image information on the original document, since only an image within a designated area is converted into cryptograph data, it is possible to accommodate all the images of the original document on a paper sheet if an operator only designates the necessary areas to be converted into a cryptograph using the digital image forming apparatus. It also is possible to output the cryptograph image on the opposite side of a non-cryptograph image side of the paper sheet and, thereby, it becomes easy to take care of the documents.

Next, description will be given of a fourth embodiment according to the present invention.

As described in the explanation of the third embodiment, there is a case in which all the cryptograph image can not be put on a paper sheet. When an amount of image information exceeds the capacity of a paper sheet as shown in FIG. 18, it is possible to output data on a plurality of paper sheets by adding page number information to the structure of the data and dividing the data as shown in FIG. 19.

Next, the cryptograph processing part 370 of the fourth embodiment will be explained.

Figure 20:
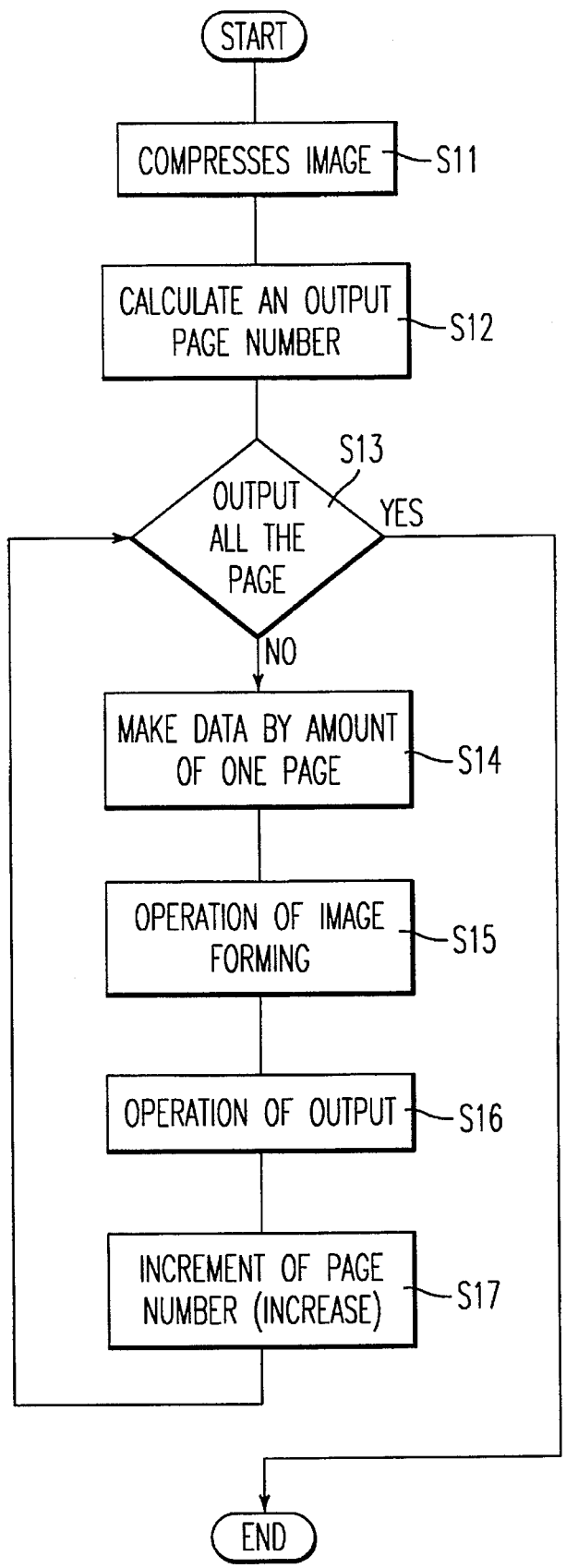
FIG. 20 is a flow chart of processing according to the fourth embodiment of the present invention.

Referring to a flow chart of FIG. 20, in the case in which the amount of image information exceeds the capacity of a paper sheet with the result that the compressed image data and the password are combined after the image is compressed in step S11, the total number of output pages needed is then calculated in step S12. Next, when each output is produced (no in step S13), data are produced by one page in step S14 and developed in the memory in step S15, and the image is output in step S16 based on the data of one page. The above processes are repeated by a total page number in step S17 and, thereby, a plurality of output paper sheets are obtained. The original document is shown in FIG. 21(*a*) and a sample of the output paper sheets is shown in FIG. 21(*b*).

In the case of restoration, all the output paper sheets are scanned by the image scanner 100, and the compressed image data are extracted and then the data parts of the extracted image data are connected in order of the numbers of the pages for each page.

According to the fourth embodiment, it is possible to output the cryptograph image on a plurality of output paper sheets in the case that all the cryptograph image data can not be put on a paper sheet, and it is possible to restore a cryptograph image data into a recognizable image by connecting image information based on the page information after scanning all the cryptograph outputs on the plurality of pages.

A description will now be given of a fifth embodiment according to the present invention. FIG. 22 is a block diagram showing a cryptograph restoring unit of the fifth embodiment.

There is a case in which an operator may want to restore only a certain page which the operator needs. However, in the case that the cryptograph data are output on a plurality of pages, it takes much time to read all the pages by the image scanner 100 in the fourth embodiment.

In a fifth embodiment, an operator indicates a password and page numbers of documents which the operator wants to restore from the operating board 310, and the image scanner 100 reads the documents. The compressed image data extracting part 3401 extracts data as shown in FIG. 19. The password which is contained in the data is compared with the password which is input by the operating board 310. When the passwords match, the image decompressing part 3502 decompresses the data on the documents based on the page numbers which have been indicated from the operating board 310, and the second image forming part 3602 and the laser printer 200 produce outputs.

In this way, according to the fifth embodiment, if an operator knows a page which the operator wants to restore, the operator can restore only the page which she or he wants to restore.

Next, description will be given of a sixth embodiment of the present invention.

In the fifth embodiment, it is difficult to let the output pages correspond to an input original document, when the operator wants to restore only pages of necessary areas. A layout which lets an input document, as shown in FIG. 24(*a*), correspond to an output page {shown in FIG. 24(*c*)} is output as shown in FIG. 24(*b*) and, thereby, it is easy to let the output pages correspond to the original document.

A controlling operation of the cryptograph processing part 370 of the sixth embodiment will now be explained.

Figure 23:
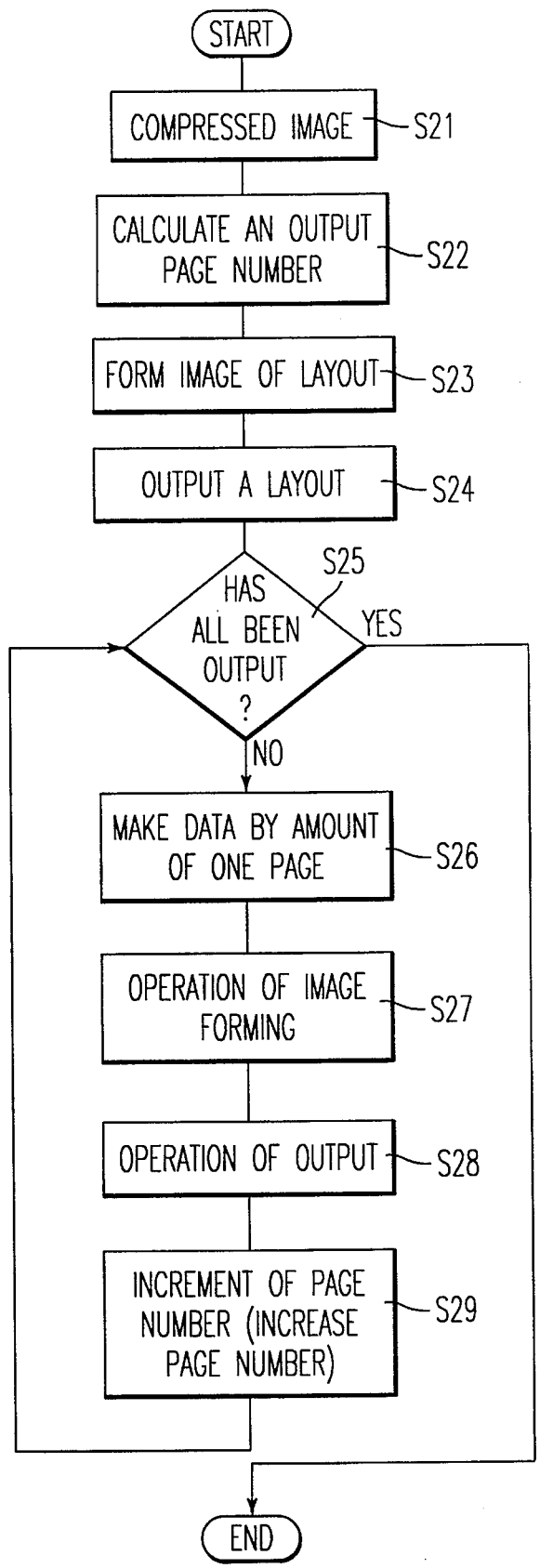
FIG. 23 is a flow chart of processing according to a sixth embodiment of the present invention.

As shown in FIG. 23, the image compressing part 3501 compresses a document image which is scanned by the image scanner 100 in step S21 and an output page number is calculated in step S22. As a result, the data structure becomes as shown in FIG. 19. The layout as shown in FIG. 24(*b*) is formed based on the page number and area position information in the data in step 23 and an image is produced in step S24. After that, as many as the calculated page numbers are produced as in the fourth embodiment in step S25 to step S29.

The layout is made by calculating each length of image areas based on the amount of data and forming lines on the output sheet and outputting page numbers at each center of the areas. According to the sixth embodiment, it becomes easy to find where output pages of the cryptograph correspond to on the original document.

In the sixth embodiment, an operator has to remember a layout of the document to correspond to documents with cryptograph output. However, it is difficult to remember the layout of the original documents from a layout of the cryptograph documents when the operator looks at the cryptograph document. And it is trouble that an operator easily recognizes the content of the original document from the cryptograph document because the secret document has to be kept confidential.

Next, description will be given of a seventh embodiment of the present invention.

An output of the seventh embodiment is shown in FIG. 25. An input document image is deteriorated and can be easily recognized on a layout on the document, and an area position information of the sixth embodiment is synthesized on the output. A flow chart of the cryptograph processing part 370 in the seventh embodiment is the same as the flow chart shown in FIG. 23.

A description will be given of a way of deteriorating an image.

As shown in FIG. 26, an image of an input bit map format is divided into blocks (e.g. 16*16 dots or 32*32 dots). The entire block is made to be black if a black pixel number is more than zero in one block and, thereby, the image shown in FIG. 26(*a*) is deteriorated as shown in FIG. 26(*b*).

According to the seventh embodiment, it becomes easy to recognize where outputs of a plurality of pages correspond to on each part of the original document.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image forming apparatus comprising:

a document reader;

an image compressing means for compressing image data read by the document reader;

a controller for selectively adding first password data input by an operating board to the compressed image data;

a memory for coding and storing the compressed image data;

an output means for outputting said coded compressed image data;

determining means for determining if the first password data has been added to the output coded compressed image data and for separating the output coded compressed image data into separated password data and separated compressed image data if the first password data has been added to the output coded compressed image data;

comparing means for comparing a second password input by the operating board with the separated password data; and restoring means for restoring the separated compressed image data only if the second password coincides with the separated password data; and controlling means for controlling so as to combine page information to said compressed image data and to output the compressed image onto a plurality of pages when an amount of an original document information is greater than a predetermined level.

2. An image forming apparatus according to claim 1, wherein the controlling means includes page calculating means for calculating a page number of output.

3. An image forming apparatus according to claim 1, wherein said restoring means includes image connecting means for connecting image information of said plurality of pages based on said page information.

4. An image forming apparatus according to claim 1, further comprising designating means for designating necessary areas on said compressed output in case of restoration, wherein said restoring means restores the original image.

* * * * *